United States Patent
Chou et al.

(10) Patent No.: US 7,664,500 B2
(45) Date of Patent: Feb. 16, 2010

(54) NETWORK SERVICE CONTROL METHOD AND AGENT DISPATCHING METHOD USED THEREIN

(75) Inventors: Li-Der Chou, Yonghe (TW);
Wei-Cheng Lai, Taipei (TW);
Chen-Hau Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 799 days.

(21) Appl. No.: 11/340,952

(22) Filed: Jan. 27, 2006

(65) Prior Publication Data
US 2007/0130461 A1 Jun. 7, 2007

Related U.S. Application Data

(60) Provisional application No. 60/742,117, filed on Dec. 2, 2005.

(51) Int. Cl.
*H04W 36/00* (2006.01)
*G06F 15/173* (2006.01)
(52) U.S. Cl. ................................ 455/436; 709/225
(58) Field of Classification Search ................. 455/436, 455/437, 438, 439, 442; 370/338; 709/225
See application file for complete search history.

(56) References Cited

U.S. PATENT DOCUMENTS

| 6,085,086 A * | 7/2000 | La Porta et al. ........... 455/432.3 |
| 6,751,464 B1 * | 6/2004 | Burg et al. ................... 455/466 |
| 6,832,087 B2 | 12/2004 | Gwon et al. ................ 455/436 |
| 6,907,245 B2 | 6/2005 | Ohlsson et al. ............. 455/442 |
| 2005/0135624 A1 | 6/2005 | Tsai et al. .................... 380/270 |

FOREIGN PATENT DOCUMENTS

| CN | 1574778 | 2/2005 |
| WO | WO 2005/072183 | 8/2005 |

* cited by examiner

*Primary Examiner*—Nick Corsaro
*Assistant Examiner*—Shannon R Brooks
(74) *Attorney, Agent, or Firm*—J.C. Patents

(57) ABSTRACT

A network service control method detects whether a mobile node communicating with a corresponding node is trending to a second local area network from a first local area network and forks and transmits a user agent and a server agent to a proxy when the mobile node is trending to the second local area network. After that, the user agent registers onto the proxy according to a result obtained by the handshaking. Finally, when the mobile node moves into the second local area network, the mobile node communicates with the user agent for obtaining a connection tunnel reserved by the user agent to communicate with the corresponding node.

13 Claims, 5 Drawing Sheets

NETWORK SERVICE CONTROL METHOD AND AGENT DISPATCHING METHOD USED THEREIN

CROSS-REFERENCE TO RELATED APPLICATION

This application claims the priority benefits of U.S. provisional application titled "STRATEGY OF A DISPATCH INTELLIGENT AGENT TO DEAL WITH WIRELESS HANDOVER" filed on Dec. 12, 2005, Ser. No. 60/742,117. All disclosure of this application is incorporated herein by reference.

BACKGROUND OF THE INVENTION

1. Field of the Invention

The present invention generally relates to a network service control method, in particular, to a network service control method using agents and agent dispatching method used therein.

2. Description of Related Art

Throughout evolution of wireless communications systems, technical challenges associated with implementing wireless communication have always been how to pose a mobile node (MN) as an MN travels from one area to another, irregularly changes its point of attachment to terrestrial radio access point (AP) with which it is communicating wirelessly. Indeed, the most critical factor in achieving good performance for mobility protocols is the design of handoff.

Handoff occurs when an MN moves from one radio AP to another. A mere change of radio AP is called a "Layer 2 (L2) handoff", which does not involve any Layer 3 (L3) signalling at the IP level. If the new radio access point is associated with a new subnet, i.e., if the MN moves from one subnet to another, a changing in routing occurs and requires a Layer 3 (L3) protocol action. This L3 protocol action is called a "L3 handoff" and usually involves exchange of a series of IP messages that are used to update routing information for the MN.

Refer to FIG. 1, which is an operation flow of a conventional handoff process, an L3 handoff process starts at the time when the mobile node enters a new subnet. Accordingly, the mobile node suffers a long duration of handoff delay because it has to wait a plurality of operations for handshaking and registration processes, which include the steps of (1) sending authentication request to the server of the new subnet (hereinafter, "a visited server"); (2) querying authentication data from the server of the home subnet (hereinafter, "a home server") by the visited server; (3) returning the authentication data from the home server; (4) determining and responding whether to permit the authentication request; (5) DHCP handshaking process between mobile node and the visited proxy; (6) registration process and (7) re-inviting process. After handoff process completed, data connection between mobile node and a corresponding node is re-established.

For better performance, many methods are provided to shorten the duration of handoff delay. For example, each of the following patents/patent applications, PCT U.S. patent application No. WO2005072183 entitled "Mobility architecture using pre-authentication, pre-configuration and/or virtual soft-handoff", U.S. Patent Application No. US2005135624 entitled "System and method for pre-authentication across wireless local area networks", U.S. Pat. No. 6,832,087 entitled "Low latency mobile initiated tunneling handoff", U.S. Pat. No. 6,907,245 entitled "Dynamic offset threshold for diversity handover in telecommunications system", and China Patent Application No. CN1574778 entitled "Selective pre-authentication to anticipated primary wireless access points" provides a solution for shortening the duration of handoff delay. However, these methods merely solve problems for single mobile node. Further, handshaking performed between server and mobile node suffers unstable network properties such that improvement of connection quality is limited.

SUMMARY OF THE INVENTION

Accordingly, the present invention is directed to a network service control method and agent dispatching method used therein. Agents are provided therein to accomplish handshaking for mobile node and server such that duration of handoff delay can be reduced and connection quality can be further improved.

In one aspect, the present invention provides a network service control method, wherein the network has at least one server to store authentication data for authorization process of a mobile node. The network service control method detects whether the mobile node communicating with a corresponding node is trending to a second local area network, whose network connection is controlled by a proxy, from a first local area network, forks and transmits an user agent to the proxy when the mobile node is trending to the second local area network and the proxy does not have agents for the mobile node, and forks and transmits a server agent to the proxy when the mobile node is trending to the second local area network and the proxy does not have agents for the server. After that, the user agent registers onto the proxy according to a result obtained by the handshaking. Finally, when the mobile node moves into the second local area network, the mobile node communicates with the user agent for obtaining a connection tunnel reserved by the user agent to communicate with the corresponding node.

In one embodiment, the network service control method further determines whether status of each agents is greater than or equals to a first threshold or less than a second threshold when the proxy has agents therein and forks a sub agent for sharing operation of one of the agents when the status of said agent is greater than or equals to the first threshold or merges one of the agents with another agent when the status of said agents is less than the second threshold.

In another embodiment, the network service control method further checks whether the mobile node is a member of a client group, and when the mobile node is a member of the client group and a first user agent for a member of the client group exists in the proxy, the first user agent is used as a group user agent for simultaneously handling handshaking for the mobile node and other member of the client group.

In another aspect, the present invention provides an agent dispatching method for network service control which is adapted to dispatch an agent for a mobile node. The agent dispatching method detects intensities of $RSSI_p$ signals and classifies the $RSSI_p$ signals. After detecting, a new $RSSI_p$ signal whose intensity is greater than any other intensity of $RSSI_p$ signals, which are not used for a first local area network where the mobile node exists, is found out. Intensity of a current $RSSI_p$ signal, which is one of the $RSSI_p$ signals used for the first local area network, is determined whether it is less than a first intensity threshold. Further, intensity of the new $RSSI_p$ signal is determined whether it is greater than a second intensity threshold. When both determinations are true, an agent is forked in local area network using the new $RSSI_p$ signal.

Accordingly, the present invention uses agents for providing different approaches to perform handshaking process such that duration of handoff delay can be effectively reduced. Moreover, concept of group user agent prevents system from wasting resources for storing individual user agent in the memory, and resources for the group user agent can be shared by the members using the group user agent.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
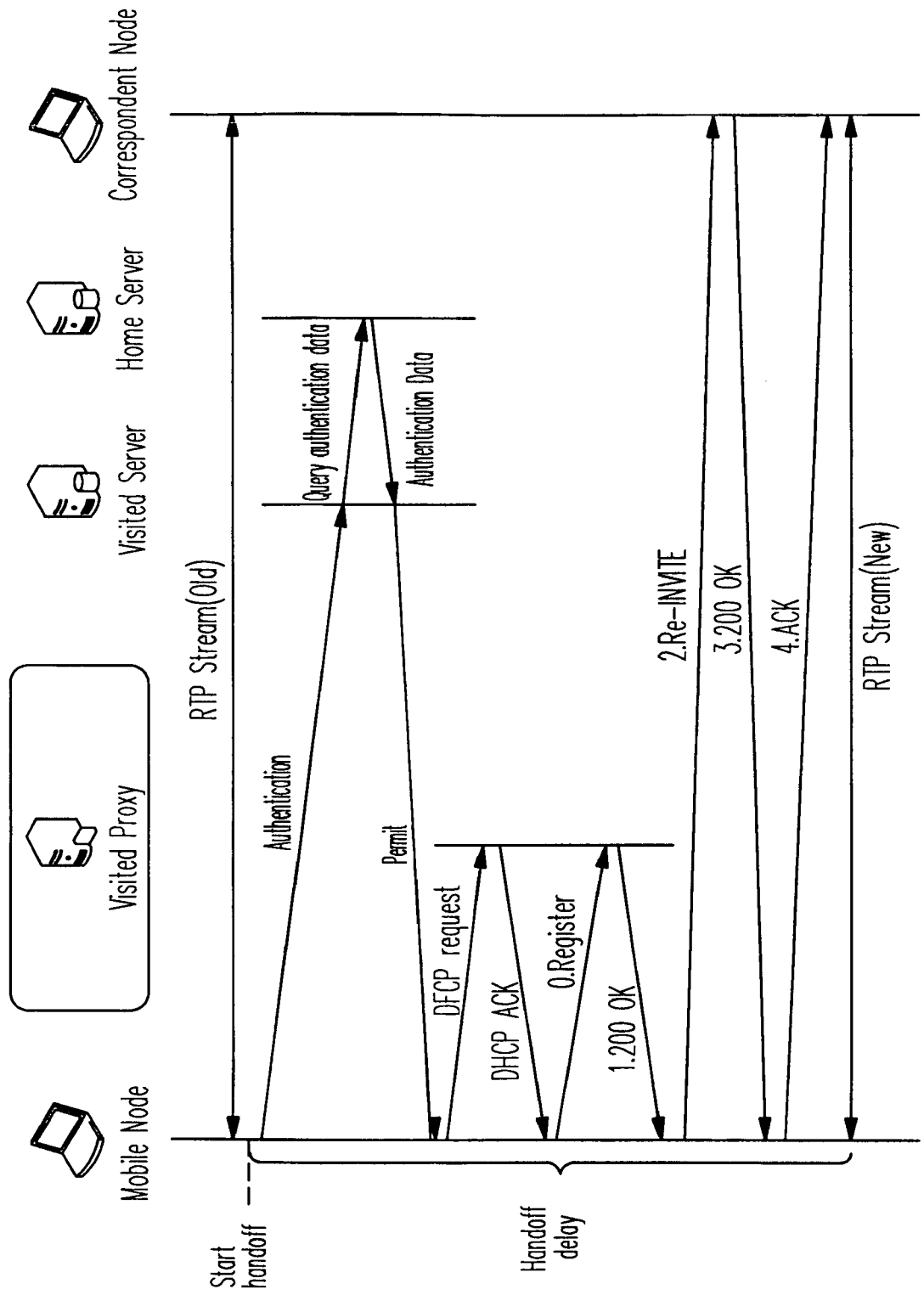
FIG. 1 is an operation flow of a conventional handoff process.

Reference will now be made in detail to the present preferred embodiments of the invention, examples of which are illustrated in the accompanying drawings. Wherever possible, the same reference numbers are used in the drawings and the description to refer to the same or like parts.

Figure 2:
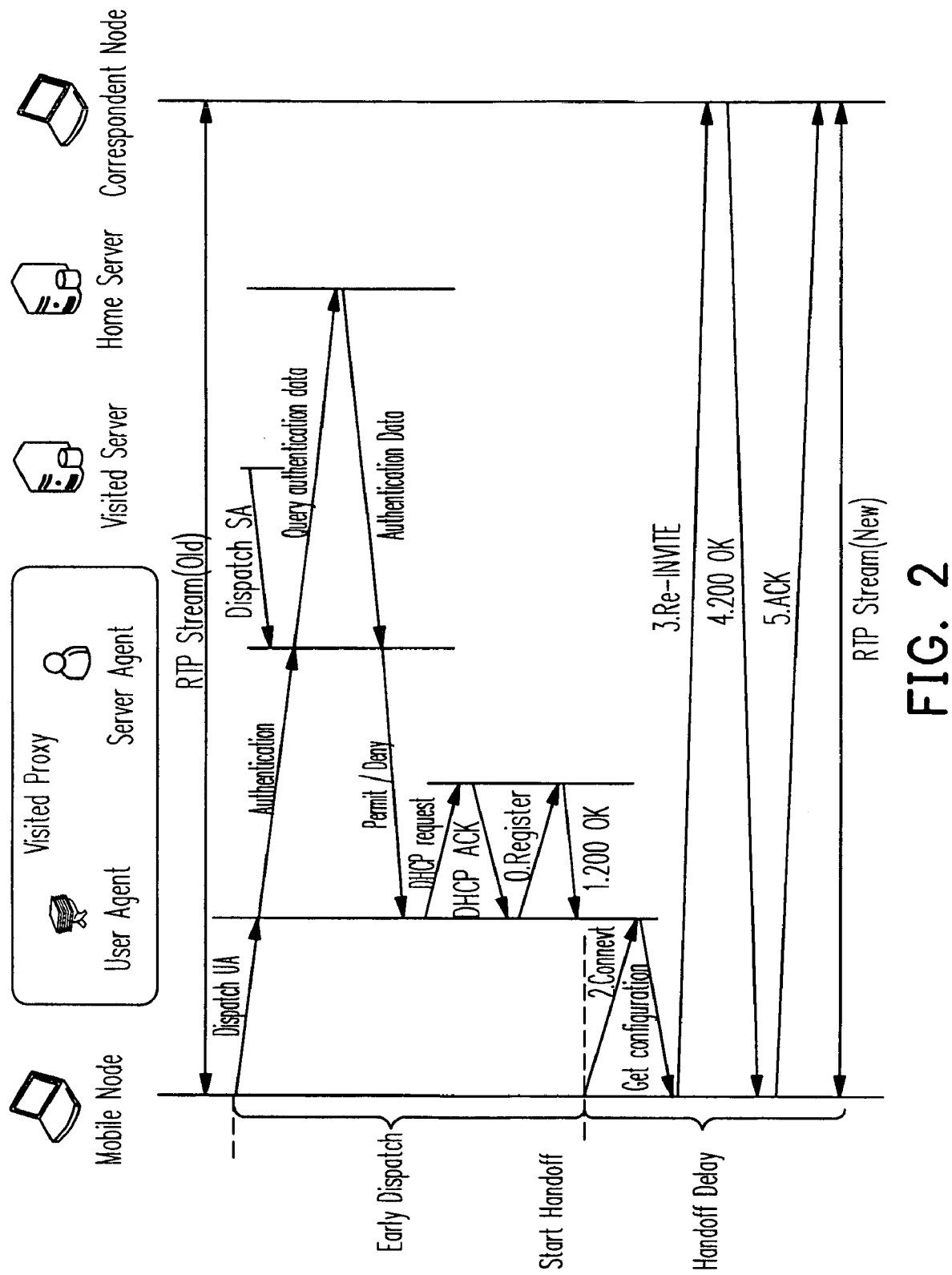
FIG. 2 is an operation flow of a handoff process in accordance with one embodiment of the present invention.

Refer to FIG. 2, which is an operation flow of a handoff process in accordance with one embodiment of the present invention. Handoff process starts at the time when the mobile node enters a new subnet. In the embodiment, when the mobile node is detected (either by itself or by any other apparatus and the mobile node is informed) to be trending to a visited local area network from a home local area network and no any user agent (UA) exists in a proxy used for registration of mobile node in the visited local area network (hereinafter, "visited proxy"), the mobile node forks and dispatches a UA to the visited proxy. Likewise, a registration server in the visited local area network (hereinafter, "visited server") forks and dispatches a server agent (SA) to the visited proxy when the mobile node is detected to be trending to the visited local area network and there is not any SA existing in the visited proxy.

After dispatching the UA and the SA to the visited proxy, the UA starts to perform handshaking process for the mobile node and a registration server in the home local area network (hereinafter, "home server"). For handshaking, the UA firstly sends an authentication request to the server agent in the visited proxy. After that, if the SA does not contain a corresponding authentication data that can fulfill the authentication request, the SA has to query the corresponding authentication data from the home server. After the authentication data is returned from the home server, the SA obtains an authentication result that indicates whether the authentication request is valid (permitted or denied) according to the authentication data. Finally, after handshaking process, the UA sends DHCP request to the visited proxy and registers onto the visited proxy when the authentication result indicates the authentication request is valid.

The agent dispatching, handshaking, DHCP requesting and registration processes are referred as "early dispatch" in the present invention. After the early dispatch is completed and the mobile node moves into the visited network, the mobile node communicates with the UA for obtaining configurations such as connection tunnel reserved by the UA in accordance with the early dispatch. Thereafter, a new data stream using the reserved tunnel is built for the mobile node to communicate with the corresponding node.

According to the method described above, handoff delay of the mobile node is effectively reduced because operations needed for handoff operation in the present invention are significantly less than those needed for handoff operation in the prior art shown in FIG. 1.

Figure 3:
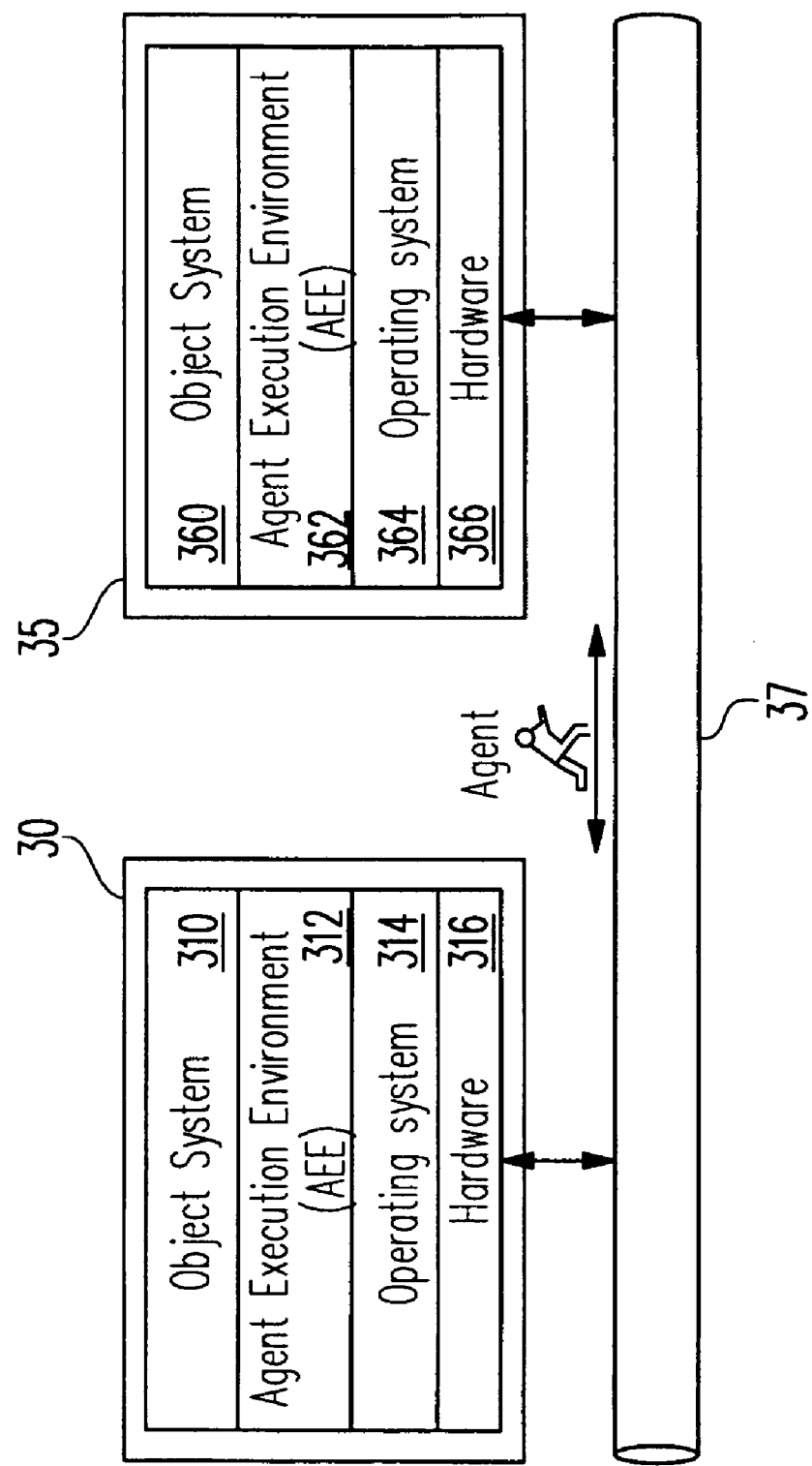
FIG. 3 is a system architecture for agent dispatching and executing according to one embodiment of the present invention.

In order to smoothly perform the above mentioned method, a proper agent system is provided. Refer to FIG. 3, which is a system architecture for agent dispatching and executing according to one embodiment of the present invention; in the architecture, two agent systems 30 and 35 are connected by using a network 37, which may include wireless LAN, GPRS, UMTS and etc. The agent system 30 includes an object system 310, an agent execution environment 312, an operating system 314 and hardware 316. Similarly, the agent system 35 includes an object system 360, an agent execution environment 362, an operating system 364 and hardware 366. Each of the hardware 316 and the hardware 366 directly communicates with the network 37. The operating systems 314 and 364 provide suitable environment for running the agent execution environments 312 and 362 and the object systems 310 and 360.

As shown in FIG. 3, agents can freely move between the agent systems. In other words, new agent can be forked to other systems while two agents, even in different agent systems, can be merged together.

In one embodiment, because quantity of the mobile nodes is much more than that of the server, concept of client group is introduced. A client group is a set comprising several mobile nodes therein, and a group UA is used for simultaneously handling operations of more than one mobile node of the client group occurred during early dispatch, such as handshaking. For each member of the client group, a checking process is further performed before forking a UA as shown in FIG. 2. The checking process checks whether the mobile node is a member of any client group and, if yes, checks whether there is any UA which is previously existed in the visited proxy for the client group. A previously existed UA or group UA is used as a group UA for other members of the client group when the mobile node is a member of this client group and the previously existed UA or group UA exists in the visited proxy before the mobile node moves into the visited local area network.

Although the above disclosed techniques reduce handoff delay, a better improvement can be applied on the group UA and SA. In another embodiment, several group user agents can be used for one client group, and several group user agents used for the same client group can be merged together to reduce the quantity of group user agents. Similarly, server agents can be forked or merged freely. The state machine of the agents is shown in FIG. 4.

Figure 4:
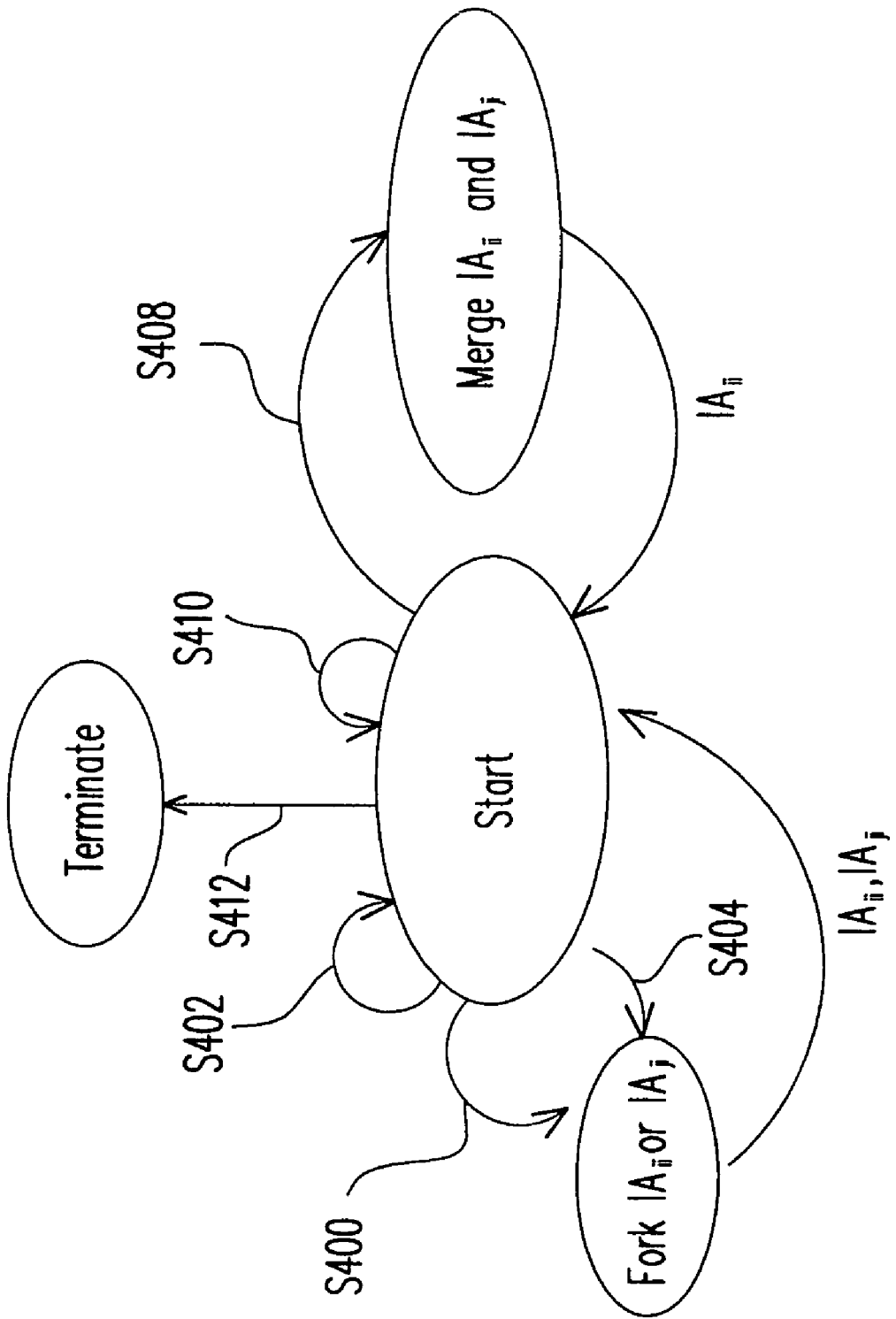
FIG. 4 is a state machine diagram of agents in accordance with one embodiment of the present invention.

FIG. 4 is a state machine diagram of agents in accordance with one embodiment of the present invention. Refer to FIG. 4, the term "$IA_{ii}$" denotes an $i^{th}$ agent forked by $i^{th}$ agent and the term "$IA_{ji}$" denotes a $j^{th}$ agent forked by $i^{th}$ agent. When the method starts, an agent $IA_{ii}$ is forked when there are needs for dispatching agents as shown in FIG. 2 (step S400). Further, when a checking status of the agent, such as load or connection quantity, either connecting to other objects or connected by other objects, of the agent $IA_{ii}$ is less than a first threshold, step S402 is performed to keep the agent $IA_{ii}$ running. On the contrary, when the checking status of the agent $IA_{ii}$ is greater than or equals to the first threshold, step S404 is performed to fork a new agent $IA_{ji}$ for sharing operation loading of the agent $IA_{ii}$.

Besides forking new agent for sharing operating loading of the original agent, two agents might be merged together to reduce occupation of resource. As shown in FIG. 4, when summation of the above mentioned statuses of two agents servicing the same object, such as the same server or the same client group, is less than a second threshold, step S408 is performed to merge the two agents. Otherwise, when summation of the above mentioned statuses of the two agents is greater than or equals to the second threshold, step S410 is performed and the two agents are kept alive.

After all, when operation of any agent is done, the agent follows step S412 such that the agent is terminated. Further, it should be noted that the first threshold and second threshold can be of either the same or different value.

Figure 5:
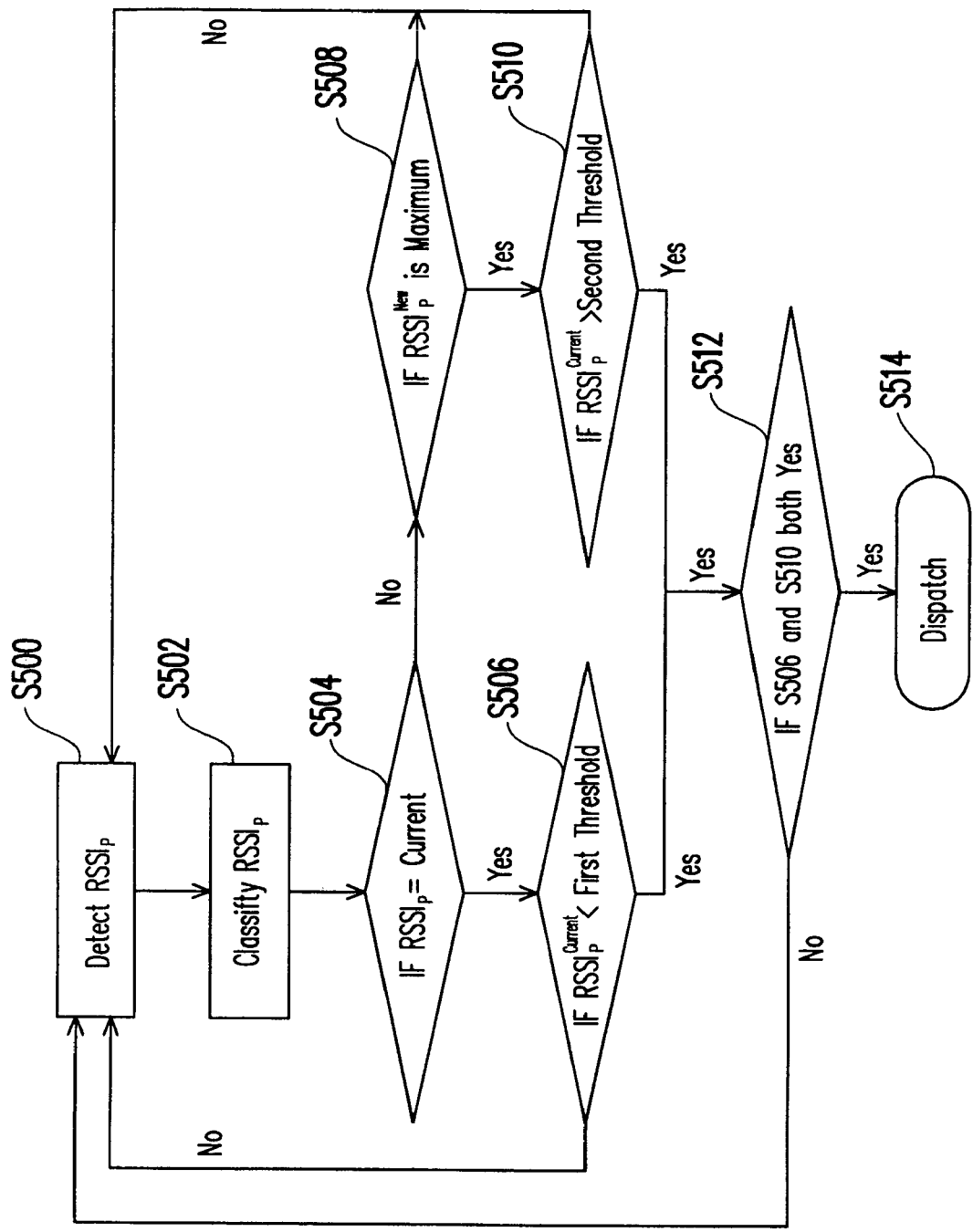
FIG. 5 is a flow chart of agent dispatching in accordance with one embodiment of the present invention.

Refer back to FIG. 2, server agent (SA) and user agent (UA) are dispatched when the mobile node is detected (either by itself or by any other apparatus and the mobile node or servers is/are informed) to be trending to a visited local area network. FIG. 5 illustrates how to detect whether a mobile node is trending to the visited local area network.

Reference is now made to FIG. 5, which is a flow chart of agent dispatching in according to one embodiment of the present invention. In the embodiment, intensities of RSSIp signals are detected in step S500. This is usually done by the mobile node since the mobile node can effectively receive all RSSIp signals. However, the received RSSIp signals can be processed by any other apparatus as well.

After detecting intensities of the $RSSI_p$ signals, the $RSSI_p$ signals are classified in accordance with the intensities in step S502. After classifying the intensities, a current $RSSI_p$ signal, which is currently used by the current local area network where the mobile node exists, is checked to determine whether its intensity (hereinafter, $RSSI_p^{current}$) is less than a first intensity threshold (steps 504 and 506). Furthermore, a new $RSSI_p$ signal whose intensity is greater than intensities of any other $RSSI_p$ signals, which are not used for the current local area network, is found out, and the intensity (hereinafter, $RSSI_p^{new}$) of the new $RSSI_p$ signal is checked to determine whether the $RSSI_p^{new}$ is greater than or equals to a second intensity threshold (steps 508 and 510).

If both the determinations performed in step S506 and S510 are true, the mobile node is determined as being trending to the local area network using the new $RSSI_p$ signal, and agents may be dispatched accordingly (steps S512 and S514). Similarly, it should be noted that the first intensity threshold and second intensity threshold can be of either the same or different value.

Because the agents described above automatically performs forking, merging and dispatching, the agents works like a human being and is referred as "intelligent agents".

Accordingly, agents are used for reducing duration of handoff delay in the present invention. Moreover, group user agent and adjustable agent forking and merging prevents system from wasting resources too much on storing individual user agent in the memory. Resources for the group user agent further can be shared by the members using the same group user agent.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A network service control method, which is adapted to a network with at least one server to store authentication data for authorization process of a mobile node, comprising:
   forking and transmitting an user agent to a proxy when the mobile node is trending from a first local area network to a second local area network and the proxy controlling network connection of the second local area network does not have agents for the mobile node;
   forking and transmitting a server agent to the proxy when the mobile node is trending to the second local area network and the proxy does not have agents for the server;
   the user agent handshakes with the server via the server agent;
   the user agent registers onto the proxy according to a result obtained by the handshaking; and
   when the mobile node moves into the second local area network, the mobile node communicates with the user agent for obtaining a connection tunnel reserved by the user agent to communicate with the corresponding node.

2. The network service control method according to claim 1 further comprising:
   determining whether status of each agent is greater than or equals to a first threshold or less than a second threshold when the proxy has agents therein;
   forking a sub agent for sharing operation of one of the agents when the status of the one of the agents is greater than or equals to the first threshold; and
   merging one of the agents with another agent when the status of the one of the agents is less than the second threshold.

3. The network service control method according to claim 2, wherein status of the agents includes loading of one of the agents.

4. The network service control method according to claim 2, wherein status of the agents includes connection quantity of one of the agents.

5. The network service control method according to claim 1, further comprising:
   detecting whether the mobile node is trending to the second local area network.

6. The network service control method according to claim 5, wherein detecting whether the mobile node is trending to the second local area network comprises:
   detecting intensities of $RSSI_p$ signals;
   classifying the $RSSI_p$ signals;
   finding out a new $RSSI_p$ signal whose intensity is greater than intensity of any other RSSIp signals being not used for the first local area network;
   determining whether intensity of a current $RSSI_p$ signal, which is one of the $RSSI_p$ signals used for the first local area network, is less than a first intensity threshold;
   determining whether intensity of the new $RSSI_p$ signal is greater than a second intensity threshold; and
   when both determinations are true, local area network uses the new $RSSI_p$ signal set as the second local area network and the mobile node is determined as trending to the second local area network.

7. The network service control method according to claim 1 further comprising:
   checking whether the mobile node is a member of a client group; and when the mobile node is a member of the client group and a first user agent for a member of the client group exists in the proxy, the first user agent is used as a group user agent for simultaneously handling handshaking for the mobile node and other member of the client group.

8. The network service control method according to claim 7 further comprising:

when the proxy has agents, determining whether status of each agent is greater than or equals to a first threshold or less than a second threshold;

when the status of one of the agents is greater than or equals to the first threshold, forking a sub agent for sharing operation of the one of the agents; and when the status of one of the agents is less than the second threshold, the one of the agents is merged with another agent.

9. The network service control method according to claim 1, wherein the user agent handshakes with the server via the server agent comprises:

the user agent sends an authentication request to the server agent;

the server agent queries a corresponding authentication data from the server; and obtaining the result from determination of whether the authentication request is valid according to the authentication data.

10. An agent dispatching method for network service control, adapted to dispatch an agent for a mobile node, comprising:

finding out a new $RSSI_p$ signal whose intensity is greater than any other intensities of $RSSI_p$ signals being not used for a first local area network in which the mobile node exists;

determining whether intensity of a current $RSSI_p$ signal, which is used for the first local area network, is less than a first intensity threshold;

determining whether intensity of the new $RSSI_p$ signal is greater than a second intensity threshold;

when both determinations are true, an agent is forked in local area network and uses the new $RSSI_p$ signal;

when a local area network has agents, determining whether status of each agent is greater than or equals to a first threshold or less than a second threshold;

when the status of one of the agents is greater than or equals to the first threshold, forking a sub agent for sharing operation of the one of the agents; and when the status of one of the agents is less than the second threshold, the one of the agents is merged with another agent.

11. The agent dispatching method for network service control according to claim 10, wherein status of the agents includes loading of one of the agents.

12. The agent dispatching method for network service control according to claim 10, wherein status of the agents includes connection quantity of one of the agents.

13. An agent dispatching method for network service control, adapted to dispatch an agent for a mobile node, comprising:

detecting intensities of $RSSI_p$ signals;

classifying the $RSSI_p$ signals;

finding out a new $RSSI_p$ signal of the $RSSI_p$ signals whose intensity is greater than any other intensities of the $RSSI_p$ signals being not used for a first local area network in which the mobile node exists;

determining whether intensity of a current $RSSI_p$ signal of the $RSSI_p$ signals, which is used for the first local area network, is less than a first intensity threshold;

determining whether intensity of the new $RSSI_p$ signal is greater than a second intensity threshold; and when both determinations are true, an agent is forked in local area network and uses the new $RSSI_p$ signal.

* * * * *